(12) United States Patent
Ratajac et al.

(10) Patent No.: US 10,174,677 B2
(45) Date of Patent: Jan. 8, 2019

(54) CLOSE-OUT ENCLOSURE FOR PANEL OF A GAS TURBINE ENGINE

(71) Applicant: Rohr, Inc., Chula Vista, CA (US)

(72) Inventors: Aleksandar Ratajac, San Diego, CA (US); Joseph C. Zecca, San Diego, CA (US)

(73) Assignee: ROHR, INC., Chula Vista, CA (US)

( * ) Notice: Subject to any disclaimer, the term of this patent is extended or adjusted under 35 U.S.C. 154(b) by 20 days.

(21) Appl. No.: 15/185,683

(22) Filed: Jun. 17, 2016

(65) Prior Publication Data

US 2017/0363009 A1   Dec. 21, 2017

(51) Int. Cl.
| | | |
|---|---|---|
| *F02C 7/25* | (2006.01) | |
| *F02K 1/54* | (2006.01) | |
| *F02C 7/28* | (2006.01) | |
| *A62C 3/08* | (2006.01) | |
| *A62C 2/06* | (2006.01) | |

(52) U.S. Cl.
CPC ............ *F02C 7/25* (2013.01); *A62C 2/06* (2013.01); *A62C 3/08* (2013.01); *F02C 7/28* (2013.01); *F02K 1/54* (2013.01); *F05D 2230/60* (2013.01)

(58) Field of Classification Search
CPC ..... F02C 7/25; F02C 7/28; A62C 2/06; A62C 3/08; A62C 3/0207; F02K 1/54; F05D 2220/32; F05D 2230/60

USPC .......................................................... 277/645
See application file for complete search history.

(56) References Cited

U.S. PATENT DOCUMENTS

| | | | | |
|---|---|---|---|---|
| 3,562,957 | A * | 2/1971 | Landis | E06B 7/2309 |
| | | | | 49/479.1 |
| 4,182,501 | A * | 1/1980 | Fage | B64C 25/423 |
| | | | | 239/265.19 |
| 5,376,423 | A * | 12/1994 | Wiegand | F16B 7/0426 |
| | | | | 24/289 |
| 6,921,086 | B2 * | 7/2005 | Selby | F16J 15/027 |
| | | | | 277/609 |
| 2010/0044466 | A1 * | 2/2010 | Vauchel | F01D 11/005 |
| | | | | 239/265.11 |
| 2011/0024994 | A1 | 2/2011 | Bunel | |
| 2015/0233261 | A1 | 8/2015 | Hodgkinson | |
| 2016/0061328 | A1 | 3/2016 | Ritoper et al. | |
| 2016/0222916 | A1 * | 8/2016 | Provost | F01D 11/005 |

* cited by examiner

*Primary Examiner* — Nathan Cumar
(74) *Attorney, Agent, or Firm* — Cantor Colburn LLP

(57) ABSTRACT

Methods and fire sealing systems for a panel of a gas turbine engine are provided. The fire sealing systems include a thermal blanket mounted on the panel, the thermal blanket having a close-out and defining a seal landing at a periphery edge of the panel, a seal retainer mounted to the panel along the seal landing, and a fire seal securely retained within the seal retainer, wherein at least one of the seal retainer or the fire seal comprises an extension portion and a blanket engaging portion such that a close-out volume formed between the thermal blanket and the fire seal above the close-out of the thermal blanket is enclosed.

20 Claims, 7 Drawing Sheets

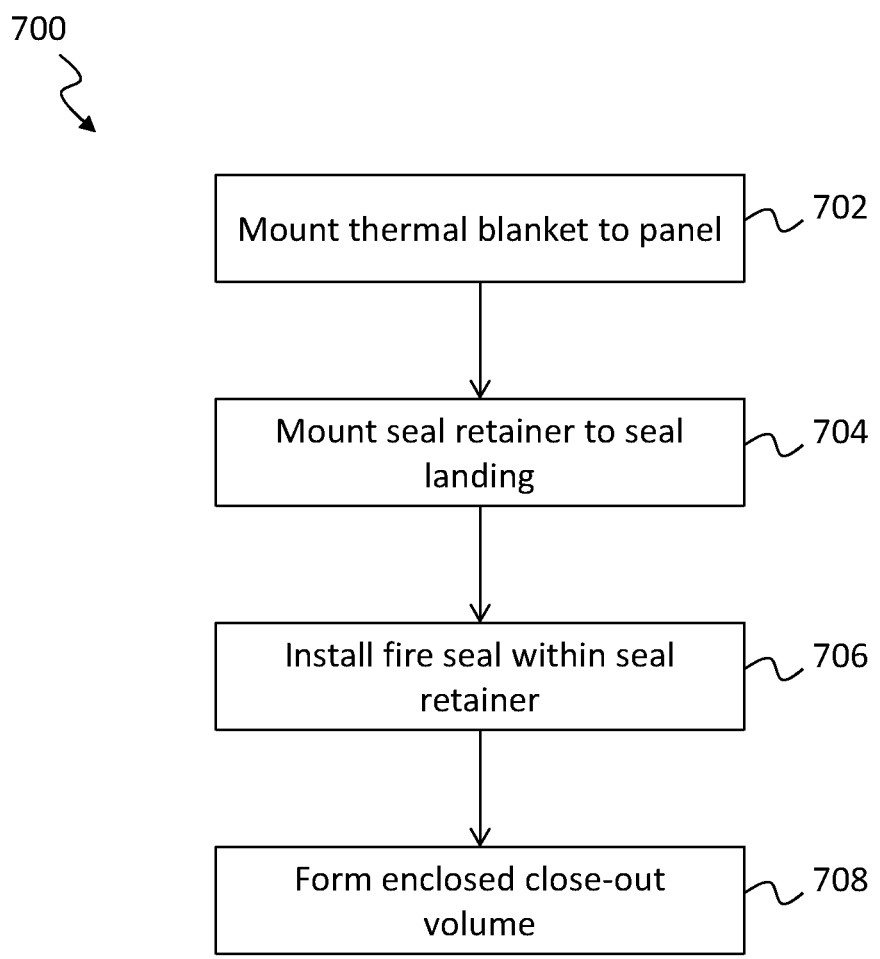

CLOSE-OUT ENCLOSURE FOR PANEL OF A GAS TURBINE ENGINE

BACKGROUND

The subject matter disclosed herein generally relates to gas turbine engine components and, more particularly, to close-out enclosures for panels of gas turbine engines.

Regulatory requirements for modern aircraft require the containment of a fire within a power plant installation. For instance, if a fire is present in the engine compartment surrounding the gas turbine engine, the structures defining the engine compartment must meet certain standards related to flame resistance and fire containment. In order to meet requirements relating to fire containment, fire seals are typically used between separate adjacent components defining the engine compartment to seal between them and prevent the spread of fire. The fire seals resist the flames and the environment of the fire, and will contain the fire by not allowing the flames to pass through. Further, thermal blankets can be employed to protect panels and/or components of the gas turbine engine. Improved fire protection within gas turbine engines may be desirable.

SUMMARY

According to one embodiment, a fire sealing system for a panel of a gas turbine engine is provided. The fire sealing system includes a thermal blanket mounted on the panel, the thermal blanket having a close-out and defining a seal landing at a periphery edge of the panel, a seal retainer mounted to the panel along the seal landing, and a fire seal securely retained within the seal retainer. At least one of the seal retainer or the fire seal comprises an extension portion and a blanket engaging portion such that a close-out volume formed between the thermal blanket and the fire seal above the close-out of the thermal blanket is enclosed.

In addition to one or more of the features described above, or as an alternative, further embodiments of the fire sealing system may include that the seal retainer defines a panel engaging portion, the extension portion and the blanket engaging portion are part of the seal retainer, and the extension portion extends from the panel engaging portion of the seal retainer.

In addition to one or more of the features described above, or as an alternative, further embodiments of the fire sealing system may include that the panel engaging portion and the extension portion are continuous and unitary.

In addition to one or more of the features described above, or as an alternative, further embodiments of the fire sealing system may include that the blanket engaging portion and the extension portion are continuous and unitary.

In addition to one or more of the features described above, or as an alternative, further embodiments of the fire sealing system may include that the blanket engaging portion is biased toward the thermal blanket to retain the thermal blanket against the panel.

In addition to one or more of the features described above, or as an alternative, further embodiments of the fire sealing system may include that the blanket engaging portion comprises a second seal engaging portion, a second seal, and a second seal retainer, wherein the second seal is configured to sealingly engage with the thermal blanket.

In addition to one or more of the features described above, or as an alternative, further embodiments of the fire sealing system may include that the extension portion and the blanket engaging portion are part of the fire seal, and the extension portion extends from the fire seal to the blanket engaging portion.

In addition to one or more of the features described above, or as an alternative, further embodiments of the fire sealing system may include a structural support within at least one of the extension portion or the blanket engaging portion.

In addition to one or more of the features described above, or as an alternative, further embodiments of the fire sealing system may include a fastener configured to fasten and secure the blanket engaging portion to the thermal blanket.

In addition to one or more of the features described above, or as an alternative, further embodiments of the fire sealing system may include that the panel is a panel of a thrust reverser of a gas turbine engine.

According to another embodiment, a method of fire sealing a panel of a gas turbine engine is provided. The method includes mounting a thermal blanket on the panel, the thermal blanket having a close-out and defining a seal landing at a periphery edge of the panel, mounting a seal retainer to the panel along the seal landing, and installing a fire seal within the seal retainer. At least one of the seal retainer or the fire seal comprises an extension portion and a blanket engaging portion such that a close-out volume formed between the thermal blanket and the fire seal above the close-out of the thermal blanket is enclosed.

In addition to one or more of the features described above, or as an alternative, further embodiments of the method may include the seal retainer defines a panel engaging portion, the extension portion and the blanket engaging portion are part of the seal retainer, and the extension portion extends from the panel engaging portion of the seal retainer.

In addition to one or more of the features described above, or as an alternative, further embodiments of the method may include that the panel engaging portion and the extension portion are continuous and unitary.

In addition to one or more of the features described above, or as an alternative, further embodiments of the method may include that the blanket engaging portion and the extension portion are continuous and unitary.

In addition to one or more of the features described above, or as an alternative, further embodiments of the method may include that the blanket engaging portion is biased toward the thermal blanket to retain the thermal blanket against the panel.

In addition to one or more of the features described above, or as an alternative, further embodiments of the method may include that the blanket engaging portion comprises a second seal engaging portion, a second seal, and a second seal retainer, wherein the second seal is configured to sealingly engage with the thermal blanket.

In addition to one or more of the features described above, or as an alternative, further embodiments of the method may include that the extension portion and the blanket engaging portion are part of the fire seal, and the extension portion extends from the fire seal to the blanket engaging portion.

In addition to one or more of the features described above, or as an alternative, further embodiments of the method may include a structural support within at least one of the extension portion or the blanket engaging portion.

In addition to one or more of the features described above, or as an alternative, further embodiments of the method may include fastening and securing the blanket engaging portion to the thermal blanket.

In addition to one or more of the features described above, or as an alternative, further embodiments of the method may include that the panel is a panel of a thrust reverser of a gas turbine engine.

Technical effects of embodiments of the present disclosure include fire sealing systems for panels of a gas turbine engine wherein a close-out volume is enclosed by a fire seal and/or a seal retainer.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

FIG. 7 is a flow process for forming an enclosed close-out volume in accordance with an embodiment of the present disclosure.

DETAILED DESCRIPTION

Figure 1A:
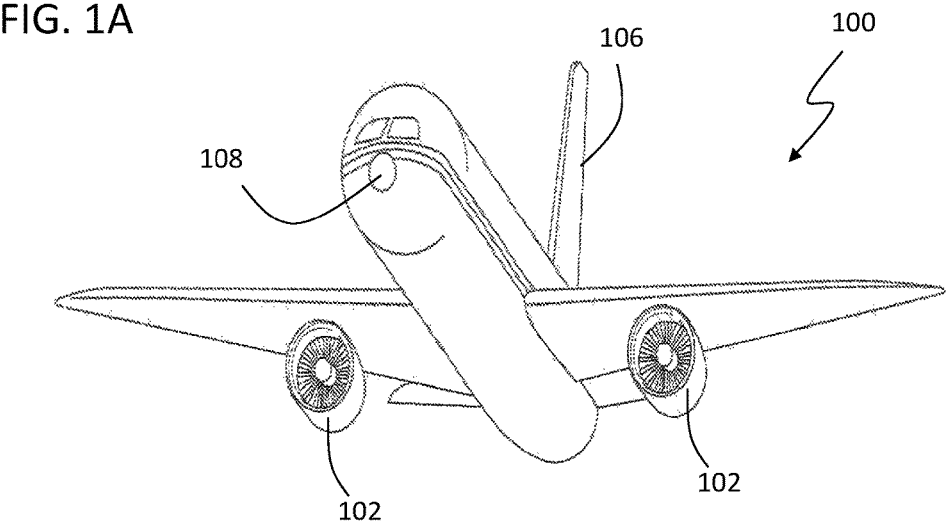
FIG. 1A is a schematic illustration of an aircraft having aircraft engines that may employ embodiments of the present disclosure.

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in FIG. X may be labeled "Xa" and a similar feature in FIG. Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

Figure 1B:
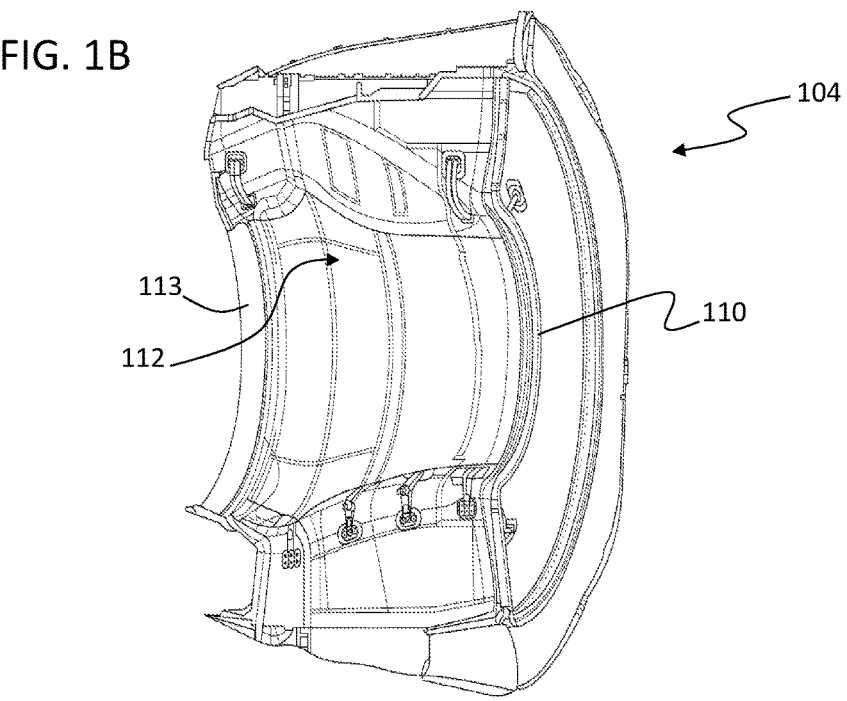
FIG. 1B is an interior schematic illustration of a portion of an aircraft engine that may employ embodiments of the present disclosure.

With reference to FIGS. 1A-1B, an aircraft 100, such as a jet or gas turbine engine aircraft, includes engines 102. The engines 102 typically include a nacelle comprising a thrust reversing structure or assembly (e.g., as shown in FIGS. 1B-1C). The nacelle surrounds and houses the turbine(s), combustor(s), compressor(s), etc. that are part of the engines 102. The thrust reversing structure or assembly can be part of a duct 104, as shown in FIGS. 1B-1B. For example, the duct 104, in some embodiments, is a C-duct pylon mounted thrust reverser of a gas turbine engine. Two ducts 104 can form a portion of the nacelle, with each duct forming about half or about 180° of the nacelle.

As used herein, "aft" refers to the direction associated with a tail 106 (e.g., the back end) of the aircraft 100, or generally, to the direction of exhaust of engines 102. As used herein, "forward" refers to the directed associated with a nose 108 (e.g., the front end) of the aircraft 100, or generally, to a direction of flight or motion.

The duct 104, as shown in FIG. 1B, has an inner fixed structure 110 that defines an area 112 therein. The area 112 may be, in some embodiments, Zone 3 of a gas turbine engine, and is configured to enclose a portion of the engine 102. In some embodiments, the area 112 is a space between components of the engine and a thrust reverser. At the aft end of the duct 104 may be a structural fitting 113, such as an exhaust duct or other structure. The area 112 can be fitted with an insulating component such as a thermal blanket or other structure.

Figure 2B:
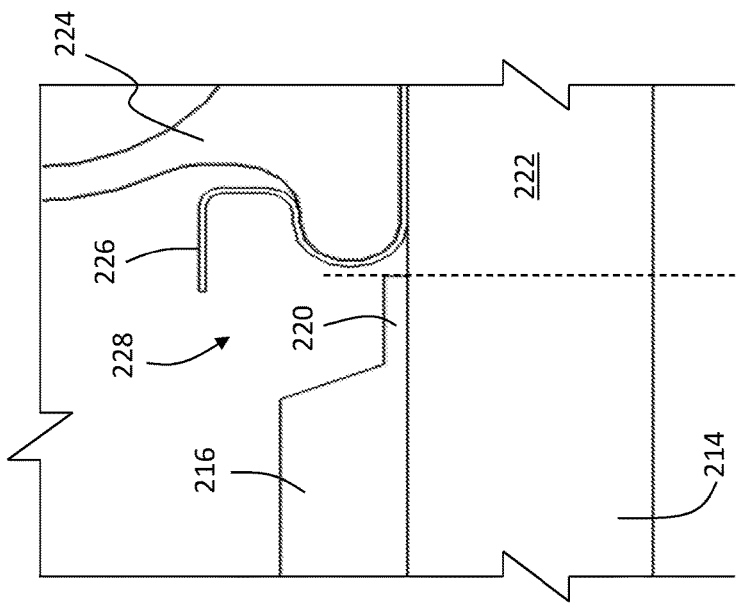
FIG. 2B is a schematic illustration of a fire seal that can be used with a panel of an aircraft engine.
Figure 2A:
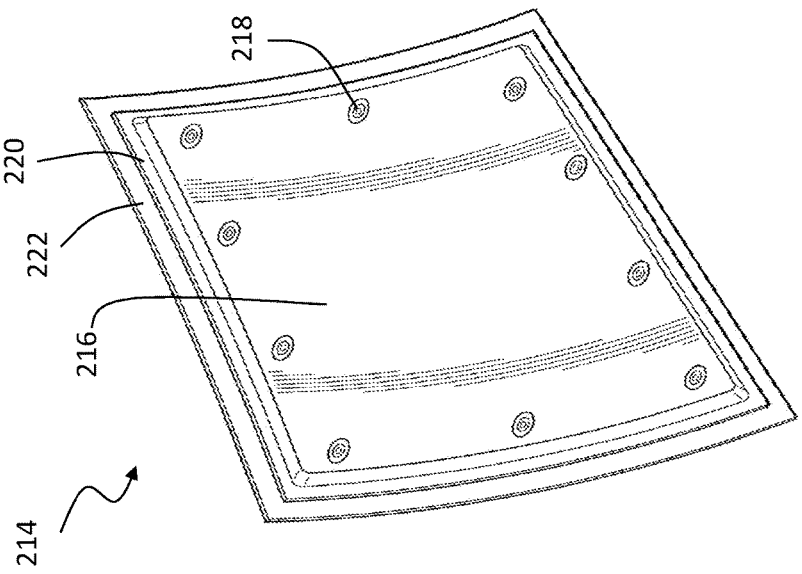
FIG. 2A is a perspective illustration of a panel of a portion of an aircraft engine that can employ one or more embodiments of the present disclosure.

For example, turning now to FIGS. 2A-2B, schematic illustration of a panel 214 having a fire seal 224 mounted thereon is shown. The panel 214 can be a bond paned for mounting a thermal blanket 216. The thermal blanket 216 can be attached to the panel 214 by bonding, and as shown, by one or more retainers 218. The retainers 218 can be snaps or other attachment devices and/or fasteners. An exterior periphery of the thermal blanket 216 includes a close-out 220. External to and surrounding the close-out 220 of the thermal blanket 216 is a seal landing 222. The seal landing 222 is a surface of the panel 214 upon which the fire seal 224 can be mounted.

As shown in FIG. 2B, the fire seal 224 is mounted to the panel 214 at the seal landing 222 within a seal retainer 226. The seal retainer 226 can be fixedly attached to the panel 214 by various attachment mechanisms including glue, adhesives, mechanical devices (e.g., screws, nails, bolts, etc.), or by other means. The fire seal 224 is configured to sealingly engage with a second seal landing (not shown) when the panel 214 is moved into a closed position (e.g., as part of an openable thrust reverser of a gas turbine engine).

The seal retainer 226 is configured to securely hold and retain the fire seal 224 about the periphery (e.g., along the seal landing 222) of the panel 214. Accordingly, the thermal blanket 216 and the fire seal 224 provide thermal protection for the panel 214. However, as shown, there is a close-out volume 228 that is formed between an edge of the thermal blanket 216 and the fire seal 224 located near the close-out 220 of the thermal blanket 216. A portion of the panel 214 is exposed to the close-out volume 228 due to the configuration of the thermal blanket 216, the close-out 220, the seal retainer 226, and the fire seal 224. The close-out volume 228 can expose the panel 214 to fire, heat, or other air that might be able to peel back and/or other affect the thermal blanket 216 and/or the fire seal 224. Accordingly, it may be advantageous to minimize or reduce the close-out volume 228.

Figure 3:
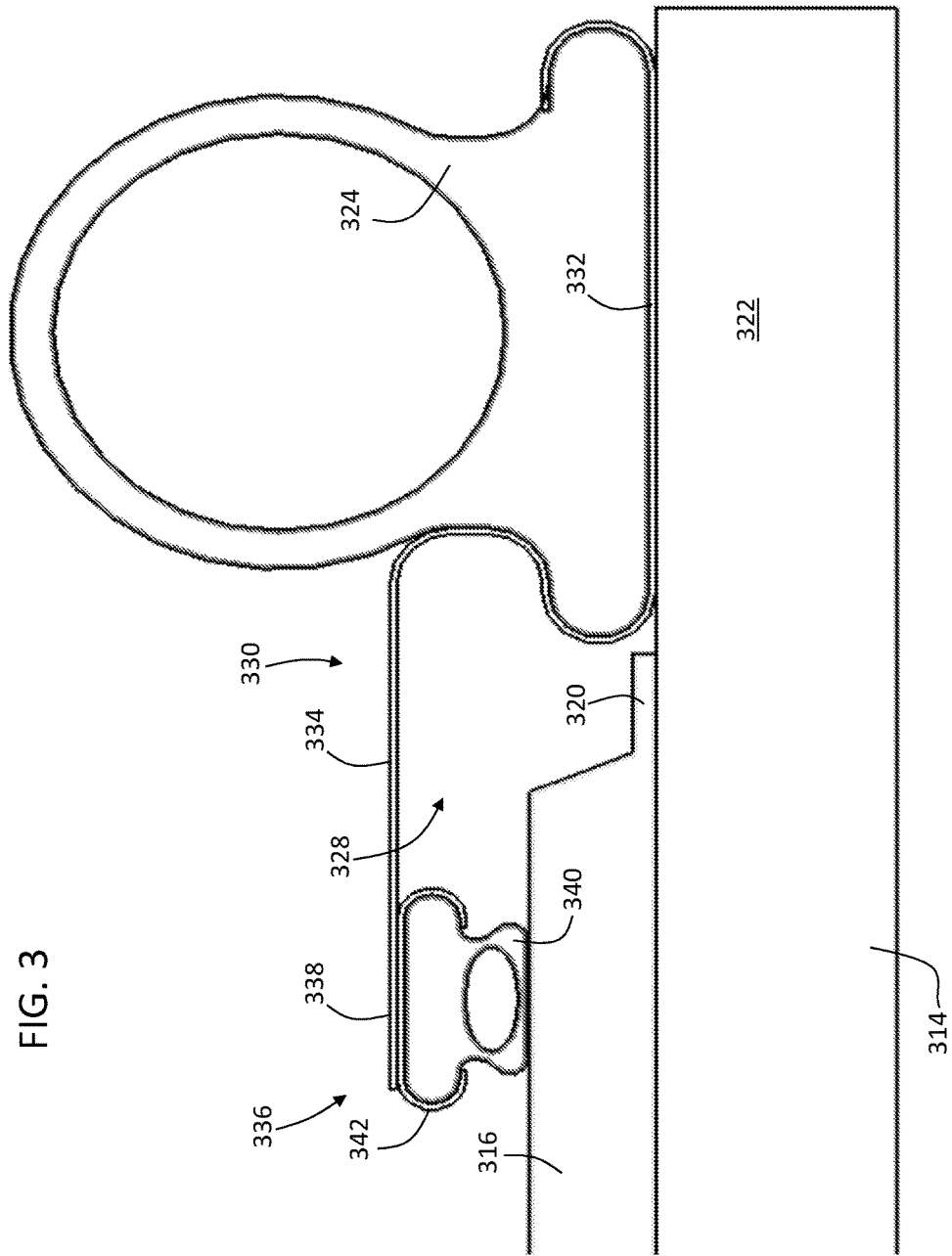
FIG. 3 is a schematic illustration of a close-out volume enclosure in accordance with an embodiment of the present disclosure.

Turning now to FIG. 3, a non-limiting embodiment of a close-out volume closure in the form of a seal retainer 330 in accordance with the present disclosure is shown. The seal retainer 330, in accordance with embodiments of the present disclosure, is a multipurpose seal retainer. That is, the seal retainer 330 is configured to retain a fire seal 324 to a panel 314 at a seal landing 322 (e.g., peripheral edge of panel 314), provide a closure or containment of a close-out volume 328, and retain and/or seal a thermal blanket 316. As noted above, the close-out volume 328 is a volume formed between the fire seal 324 and the thermal blanket 316 about a close-out 320 of the thermal blanket 316.

As shown, the seal retainer 330 includes a panel engaging portion 332, an extension portion 334, and a blanket engaging portion 336. As shown, the panel engaging portion 332 is configured to engage with (i.e., attach to) the seal landing 322 of the panel 314. The panel engaging portion 332 can be fixedly attached to the seal landing 322 by various mechanisms, including, but not limited to, fasteners, glue, adhesives, bonding, welding, etc. Further, as shown, the panel engaging portion 332 is configured to retain the fire seal 324.

The extension portion 334 of the seal retainer 330 is configured to extend from the panel engaging portion 332 toward the thermal blanket 316. The extension portion 334 defines a surface or other body that covers the close-out volume 328, thus defining a closed close-out volume 328. At an opposite end of the extension portion 334 from the seal engaging portion 332 is the blanket engaging portion 336. That is, the extension portion 334 is configured between the seal engaging portion 332 and the blanket engaging portion 336.

The blanket engaging portion 336, as shown in FIG. 3, includes a second seal engaging portion 338, a second seal 340, and a second seal retainer 342. As shown, the second seal 340 is mounted to the second seal engaging portion 338 such that the second seal 340 can contact and sealingly engage with a surface of the thermal blanket 316. The second seal retainer 342 is configured to securely retain and mount the second seal 340 to the second seal engaging portion 338.

Accordingly, the seal retainer 330 defines a relatively closed and/or enclosed close-out volume 328. As such, the panel 314 and/or the close-out 320 of the thermal blanket 316 will not be exposed to fire, heat, and/or air that can adversely impact the thermal blanket 316 and/or the fire seal 324.

In some embodiments, the blanket engaging portion 336 can be configured to not only form a seal with a surface of the thermal blanket 316, but may provide additional structural features. For example, the extension portion 334 and/or the blanket engaging portion 336 of the seal retainer 330 can be biased such that a force is applied toward the thermal blanket 316. The applied force can be employed to aid in the retention of the thermal blanket 316 against the panel 314. Further, in some embodiments, sufficient force can be applied by the blanket engaging portion 336 of the seal retainer 330 such that additional and/or other retainers (e.g., fasteners, adhesives, etc.) can be eliminated from the construction of the thermal blanket 316 and panel 314 design and configuration. Advantageously, this may enable a reduction in the number of components, a reduction in weight, and/or a reduction in the number of stress points experienced by the thermal blanket 316 and/or the panel 314.

Figure 4:
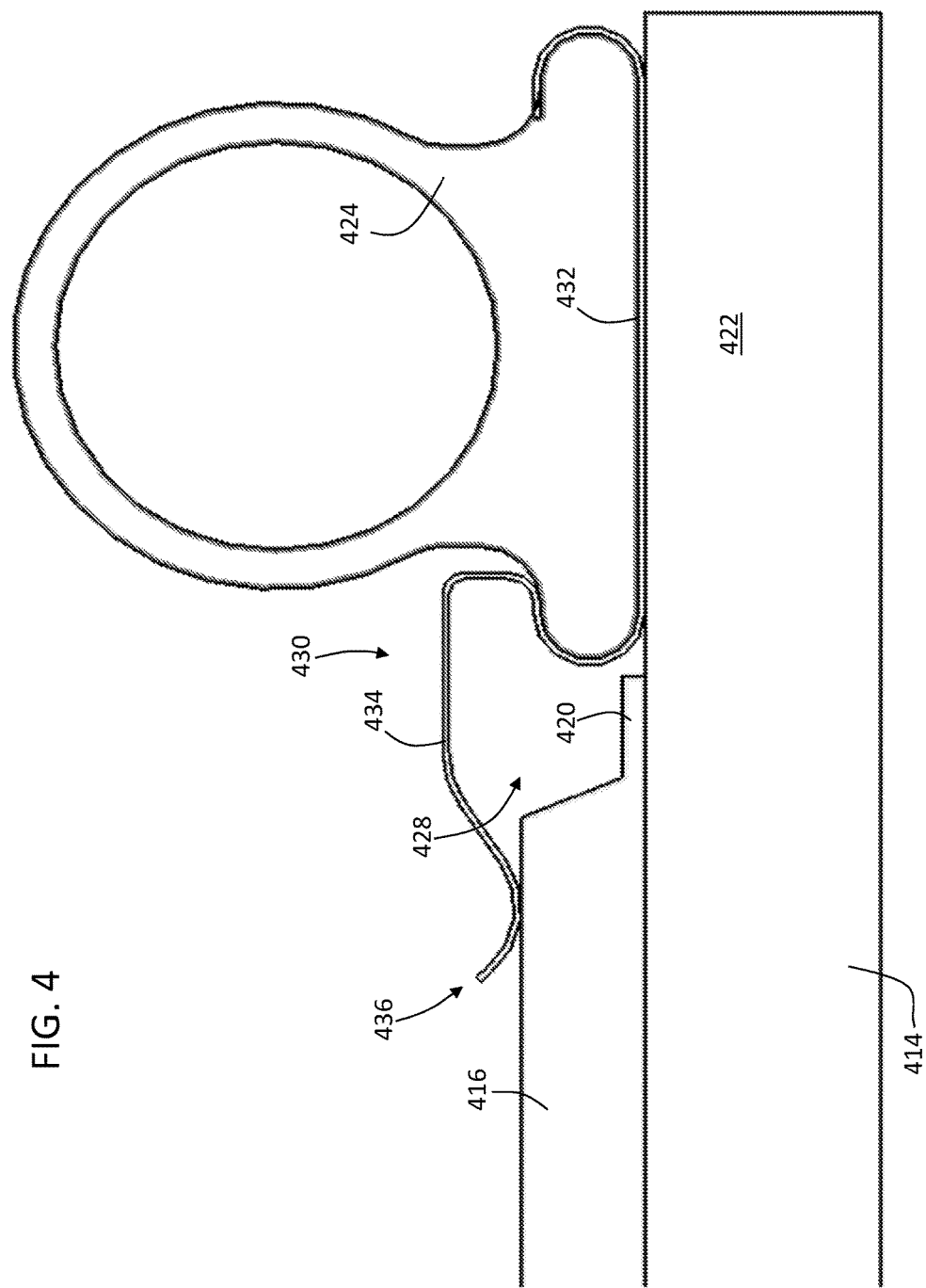
FIG. 4 is a schematic illustration of another close-out volume enclosure in accordance with an embodiment of the present disclosure.

Turning now to FIG. 4, an alternative configuration of a close-out volume closure in the form of another seal retainer in accordance with the present disclosure is shown. The seal retainer 430 of FIG. 4 is similar to the seal retainer 330 of FIG. 3 and is a multipurpose seal retainer. That is, the seal retainer 430 is configured to retain a fire seal 424 to a panel 414 at a seal landing 422 (e.g., peripheral edge of panel 414), provide a closure or containment of a close-out volume 428, and retain and/or seal a thermal blanket 416. As noted above, the close-out volume 428 is a volume formed between the fire seal 424 and the thermal blanket 416 about a close-out 420 of the thermal blanket 416.

As shown, the seal retainer 430 includes a panel engaging portion 432, an extension portion 434, and a blanket engaging portion 436. As shown, the panel engaging portion 432 is configured to engage with (i.e., attach to) the seal landing 422 of the panel 414. The panel engaging portion 432 can be fixedly attached to the seal landing 422 by various mechanisms, including, but not limited to, fasteners, glue, adhesives, bonding, welding, etc. Further, as shown, the panel engaging portion 432 is configured to retain the fire seal 424.

The extension portion 434 of the seal retainer 430 is configured to extend from the panel engaging portion 432 toward the thermal blanket 416. The extension portion 434 defines a surface or other body that covers the close-out volume 428, thus defining a closed close-out volume 428. At an opposite end of the extension portion 434 from the seal engaging portion 432 is the blanket engaging portion 436. That is, the extension portion 434 is configured between the seal engaging portion 432 and the blanket engaging portion 436.

The blanket engaging portion 436, as shown in FIG. 4, has a different configuration/structure than that shown in FIG. 3. As shown, blanket engaging portion 436 is configured to directly contact the thermal blanket 416. That is, the blanket engaging portion 436 of the seal retainer 430 forms a seal with the thermal blanket 416. Accordingly, the seal retainer 430 defines a relatively closed and/or enclosed close-out volume 428. As such, the panel 414 and/or the close-out 420 of the thermal blanket 416 will not be exposed to fire, heat, and/or air that can adversely impact the thermal blanket 416 and/or the fire seal 424.

In some embodiments, the blanket engaging portion 436 can be configured to not only form a seal with a surface of the thermal blanket 416, but may provide additional structural features, as described above. For example, the extension portion 434 and/or the blanket engaging portion 436 of the seal retainer 430 can be biased such that a force is applied toward the thermal blanket 416. The applied force can be employed to aid in the retention of the thermal blanket 416 against the panel 414. Further, in some embodiments, sufficient force can be applied by the blanket engaging portion 436 of the seal retainer 430 such that additional and/or other retainers (e.g., fasteners, adhesives, etc.) can be eliminated from the construction of the thermal blanket 416 and panel 414 design and configuration. Advantageously, this may enable a reduction in the number of components, a reduction in weight, and/or a reduction in the number of stress points experienced by the thermal blanket 416 and/or the panel 414.

Figure 5:
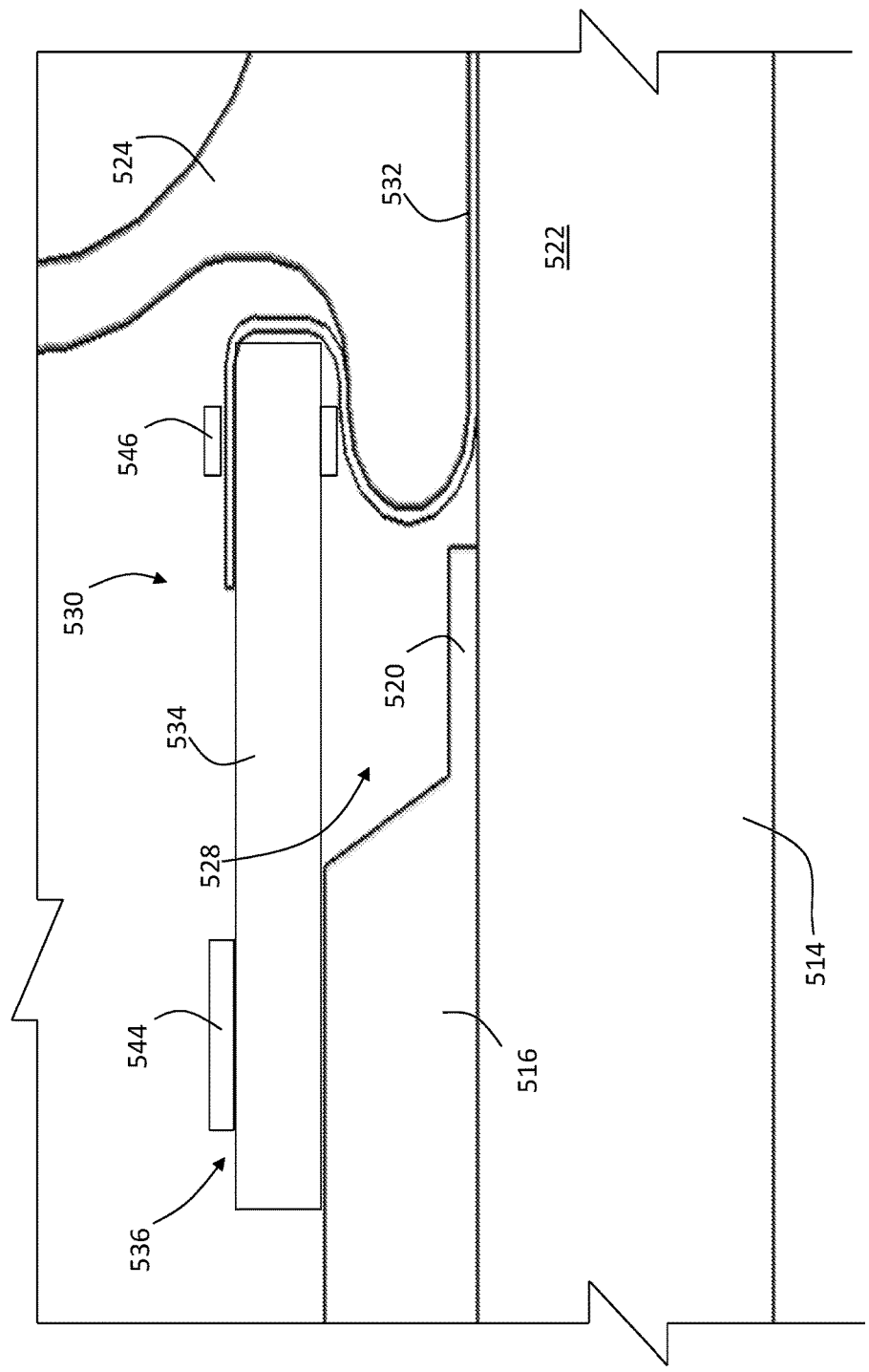
FIG. 5 is a schematic illustration of another close-out volume enclosure in accordance with an embodiment of the present disclosure.

Turning now to FIG. 5, another alternative configuration of a close-out volume closure in accordance with the present disclosure is shown. A seal retainer 530 of FIG. 5 is similar to the seal retainers 330, 430 of FIGS. 3-4 and is a multipurpose seal retainer. That is, the seal retainer 530 is configured to retain a fire seal 524 to a panel 514 at a seal landing 522 (e.g., peripheral edge of panel 514), provide a closure or containment of a close-out volume 528, and retain and/or seal a thermal blanket 516. As noted above, the close-out volume 528 is a volume formed between the fire seal 524 and the thermal blanket 516 about a close-out 520 of the thermal blanket 516.

As shown, the seal retainer 530 includes a panel engaging portion 532, an extension portion 534, and a blanket engaging portion 536. As the seal retainer is similar to the prior configurations, similar aspects will not be described again. However, as shown, the seal retainer 530 is a multipart seal retainer. That is, the extension portion 534 is separate from the panel engaging portion 532. Further, as shown, the blanket engaging portion 536 is fastened to the thermal blanket 516 by a first fastener 544. In some embodiments, the first fastener 544 may be a retainer as used to retain the thermal blanket 516 to the panel 514 (e.g., as shown in FIG. 2A). Additionally, as shown, the extension portion 534, in the embodiment of FIG. 5, is mechanically attached to the panel engaging portion 532 by a second fastener 546. Those of skill in the art will appreciate that in some embodiments, the extension portion 534 and the panel engaging portion 532 can be a single component, and thus the second fastener 546 can be eliminated (e.g., similar to that shown in FIG. 3). Similar to the embodiments described above, the seal retainer 530 provides an enclosed close-out volume 528.

Figure 6:
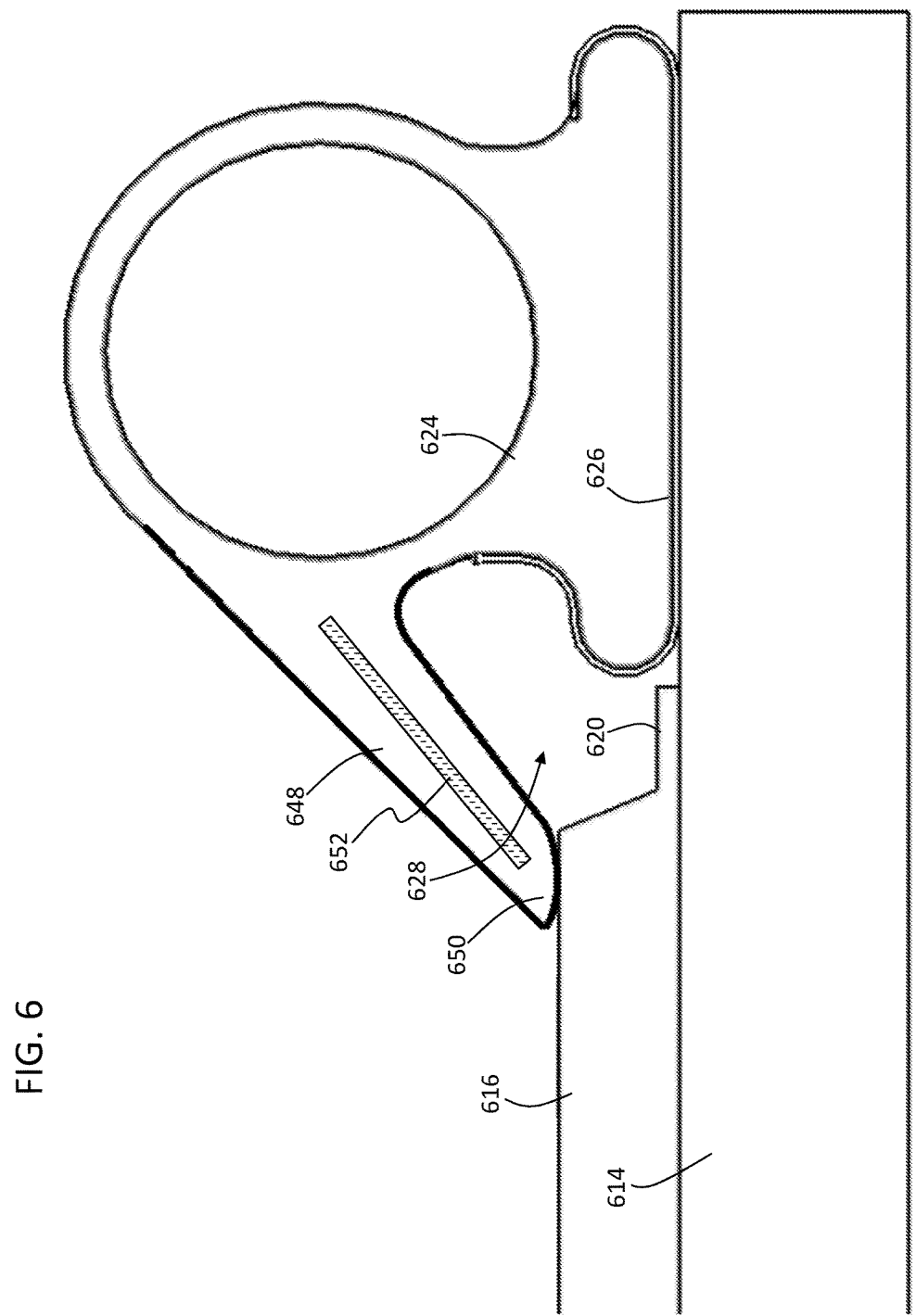
FIG. 6 is a schematic illustration of another close-out volume enclosure in accordance with an embodiment of the present disclosure.

Turning now to FIG. 6, an alternative configuration of a close-out volume closure in accordance with the present disclosure is shown. In the embodiment of FIG. 6, rather than employing a portion of a seal retainer to form the close-out volume closure, the close-out volume closure is formed from a portion of a fire seal. That is, as shown in FIG. 6, a fire seal 624 includes an extension portion 648 and a blanket engaging portion 650. The final configuration is similar to that described above, wherein a close-out volume 628 is enclosed above a close-out 620 of a thermal blanket 616. Further, as shown, the fire seal 624 is mounted or secured within a seal retainer 626 (e.g., similar to seal retainer 226 of FIG. 2). Because the extension portion 648 and the blanket engaging portion 650 are part of the fire seal 624, an optional structural support 652 can be configured within the extension portion 648 and/or the blanket engaging portion 650 to provide rigidity and/or bias toward the thermal blanket 616. In some alternative embodiments, the blanket engaging portion 650 can be configured to receive a retainer and/or fastener to physically engage the blanket engaging portion 650 to the thermal blanket 616 (e.g., retainers 218 shown in FIG. 2A).

Turning now to FIG. 7, a flow process for enclosing a close-out volume to form a fire seal on a panel in accordance with a non-limiting embodiment of the present disclosure is shown. The flow process 700 can be performed using the above described embodiments and/or variations thereon. As described herein, the panel is a component or a panel of a component of a gas turbine engine that is subject to high temperatures and/or risk of fire, wherein it is desirable to prevent fire from reaching certain areas.

At block 702, a thermal blanket is mounted to the panel. At block 704, a seal retainer is mounted to a seal landing at the periphery of the panel around the mounted thermal blanket. At block 706, a fire seal is installed into or within the seal retainer. At block 708 an enclosed close-out volume is formed. The formation of the enclosed close-out volume is by a portion of at least the fire seal or the seal retainer. For example, one of the fire seal or the seal retainer includes an extension portion that extends toward the thermal blanket and a blanket engaging portion is used to engage with the thermal blanket. The engagement of the engaging portion to the thermal blanket provides a seal to form the enclosed close-out volume, as shown and described above. In some embodiments, the blanket engaging portion and/or the extension portion are configured to apply a force to the thermal blanket such that the close-out volume enclosure provides multiple functions, including, but not limited to, forming an enclosed close-out volume and securing the thermal blanket to the panel. Those of skill in the art will appreciate that the order of the flow process 700 is not to be limiting, and variations thereon and/or additional or alternative steps may be incorporated without departing from the scope of the present disclosure.

Advantageously, embodiments described herein provide improved and/or additional protection to a panel and/or component of a gas turbine engine. Further, advantageously, enclosing the close-out volume, as provided herein, can reduce the chance of thermal blanket peeling off from the panel. Moreover, advantageously, various embodiments provided herein can reduce and/or eliminate the total number of parts/components used to provide thermal/fire protection to a panel or component of a gas turbine engine.

The use of the terms "a," "an," "the," and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to normal operational attitude and should not be considered otherwise limiting.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description, but is only limited by the scope of the appended claims.

What is claimed is:

1. A fire sealing system for a panel of a gas turbine engine, the fire sealing system comprising:
   a thermal blanket mounted on the panel, the thermal blanket having a close-out and defining a seal landing at a periphery edge of the panel;
   a seal retainer being a first separate structure and mounted to the panel along the seal landing; and
   a fire seal being a second separate structure and securely retained within the seal retainer,
   wherein at least one of the seal retainer or the fire seal comprises an extension portion and a blanket engaging portion such that a close-out volume formed between the thermal blanket and the fire seal above the close-out of the thermal blanket is enclosed.

2. The fire sealing system of claim 1, wherein:
   the seal retainer defines a panel engaging portion, the extension portion and the blanket engaging portion are part of the seal retainer, and the extension portion extends from the panel engaging portion of the seal retainer.

3. The fire sealing system of claim 2, wherein the panel engaging portion and the extension portion are continuous and unitary.

4. The fire sealing system of claim 2, wherein the blanket engaging portion and the extension portion are continuous and unitary.

5. The fire sealing system of claim 2, wherein the blanket engaging portion is biased toward the thermal blanket to retain the thermal blanket against the panel.

6. The fire sealing system of claim 2, wherein the blanket engaging portion comprises a second seal engaging portion, a second seal, and a second seal retainer, wherein the second seal is configured to sealingly engage with the thermal blanket.

7. The fire sealing system of claim 1, wherein:

the extension portion and the blanket engaging portion are part of the fire seal, and the extension portion extends from the fire seal to the blanket engaging portion.

8. The fire sealing system of claim 7, further comprising a structural support within at least one of the extension portion or the blanket engaging portion.

9. The fire sealing system of claim 1, further comprising a fastener configured to fasten and secure the blanket engaging portion to the thermal blanket.

10. The fire sealing system of claim 1, wherein the panel is a panel of a thrust reverser of a gas turbine engine.

11. A method of fire sealing a panel of a gas turbine engine comprising:

mounting a thermal blanket on the panel, the thermal blanket having a close-out and defining a seal landing at a periphery edge of the panel;

mounting a seal retainer to the panel along the seal landing, the seal retainer being a first separate structure; and installing a fire seal within the seal retainer, the fire seal being a second separate structure, wherein at least one of the seal retainer or the fire seal comprises an extension portion and a blanket engaging portion such that a close-out volume formed between the thermal blanket and the fire seal above the close-out of the thermal blanket is enclosed.

12. The method of claim 11, wherein:

the seal retainer defines a panel engaging portion, the extension portion and the blanket engaging portion are part of the seal retainer, and the extension portion extends from the panel engaging portion of the seal retainer.

13. The method of claim 12, wherein the panel engaging portion and the extension portion are continuous and unitary.

14. The method of claim 12, wherein the blanket engaging portion and the extension portion are continuous and unitary.

15. The method of claim 12, wherein the blanket engaging portion is biased toward the thermal blanket to retain the thermal blanket against the panel.

16. The method of claim 12, wherein the blanket engaging portion comprises a second seal engaging portion, a second seal, and a second seal retainer, wherein the second seal is configured to sealingly engage with the thermal blanket.

17. The method of claim 11, wherein:

the extension portion and the blanket engaging portion are part of the fire seal, and the extension portion extends from the fire seal to the blanket engaging portion.

18. The method of claim 17, further comprising a structural support within at least one of the extension portion or the blanket engaging portion.

19. The method of claim 11, further comprising fastening and securing the blanket engaging portion to the thermal blanket.

20. The method of claim 11, wherein the panel is a panel of a thrust reverser of a gas turbine engine.

* * * * *